US006835558B2

(12) United States Patent
Van Lengerich et al.

(10) Patent No.: US 6,835,558 B2
(45) Date of Patent: Dec. 28, 2004

(54) BETA-GLUCAN COMPOSITIONS AND PROCESS THEREFORE

(75) Inventors: Bernhard H. Van Lengerich, Plymouth, MN (US); Olaf Gruess, Maple Grove, MN (US); Friedrich P. Meuser, Berlin (DE)

(73) Assignee: General Mills, Inc., Minneapolis, MN (US)

( * ) Notice: Subject to any disclaimer, the term of this patent is extended or adjusted under 35 U.S.C. 154(b) by 94 days.

(21) Appl. No.: 10/067,016

(22) Filed: Feb. 4, 2002

(65) Prior Publication Data

US 2003/0153746 A1 Aug. 14, 2003

(51) Int. Cl.$^7$ .......................... C12P 19/14; C12P 19/04; C12S 3/02
(52) U.S. Cl. ..................... 435/99; 435/101; 435/72; 435/274
(58) Field of Search ..................... 435/99, 101, 72, 435/274

(56) References Cited

U.S. PATENT DOCUMENTS

| | | |
|---|---|---|
| 4,028,468 A | 6/1977 | Hohner et al. |
| 4,804,545 A | 2/1989 | Goering et al. |
| 5,013,561 A | 5/1991 | Goering et al. |
| 5,106,640 A | 4/1992 | Lehtomaki et al. |
| 5,183,677 A | 2/1993 | Lehtomaki et al. |
| 5,244,887 A | 9/1993 | Straub |
| 5,502,045 A | 3/1996 | Miettinen et al. |
| 5,512,287 A | 4/1996 | Wang et al. |
| 5,518,710 A | 5/1996 | Bhatty |
| 5,576,306 A | 11/1996 | Dressman et al. |
| 5,585,366 A | 12/1996 | Gallaher et al. |
| 6,020,324 A | 2/2000 | Jamas et al. |
| 6,025,348 A | 2/2000 | Goto et al. |
| 6,087,353 A | 7/2000 | Stewart et al. |
| 6,136,349 A | 10/2000 | Karppanen et al. |
| 6,143,731 A | 11/2000 | Jamas et al. |
| 6,174,560 B1 | 1/2001 | Miettenen et al. |
| 6,231,915 B1 | 5/2001 | van Amerongen et al. |
| 6,248,387 B1 | 6/2001 | DeVay |
| 2001/0027190 A1 | 10/2001 | Akashe et al. |

FOREIGN PATENT DOCUMENTS

| | | |
|---|---|---|
| WO | WO 98/13056 | 4/1998 |
| WO | WO 00/49052 | 8/2000 |

OTHER PUBLICATIONS

Kanauchi et al (Cereal Chem. 87(2):121–124 (2001)).*
Bamforth et al (J. Inst. Brew. 107(4):235–240 (2001)).*
Welch, Robert W., 1995, "The Oat Crop—Production and Utilization", pps.462–468.
Carroll, K. K.. Hamilton, R.M.G., 1975, "SYMPOSIUM: Nutritional perspectives and Atherosclerosis—Effects of Dietary Protein and Carbohydrate on Plasma Cholesterol Levels in Relation to Atheroscelerosis" (*Journal of Food Science*), 40, pps. 18–23.

Kritchevsky, D., Tepper, S.A., Klurfeld, D.M., 1987, "Dietary Protein and Atherosclerosis" (Cholesterol and Dietary Protein) (JAOCS, vol. 64, No. 8), pps. 1167–71.
Welch, R.W., Peterson, D.M., Schramka, B., 1988, "Hypocholesterolemic and Gastrointestinal Effects of Oat Bran Fractions in Chicks[1,2,3]"*Nutrition Reports International*, vol.. 38, No. 3), pps. 551–561.
Graham, A. & H., 1987, "Analysis of Total and Insoluble Mixed–Linked (1→3),(1→4)–β–D–*Glucans in Barley and Oats*" (*American Chemical Society*) (*J. Agric. Food Chem*, vol. 35, No. 5), pps. 704–709.
Beer, M.U., Arrigoni, E., Amado, R., 1996, "Extraction of Oat Gum from Oat Bran: Effects of Process on Yield, Molecular Weight Distribution, Viscosity and (1→3)(1→4)–β–D–Glucans Content of the Gum" (*Cereal Chemistry*, vol. 73, No. 1), pps. 58–62.
Zhang, D., Doehlert, D.C., Moore, W.R., 1998, "Rheological Properties of (1→3),(1→4)–β–D–Glucans from Raw, Roasted, and Steam ed Oat Groats" (*Cereal Chemistry*., vol. 75, No. 4), pps. 433–438.
Bhatty, R.S., 1999, "β–Glucan and Flour Yield of Hull–less Barley" (*Cereal Chemistry*, vol. 76, No. 2), pps. 314–315.
Temelli, F., 1997, "Extraction and Functional Properties of Barley β–Glucan as Affected by Temperature and pH" (*Journal of Food Science*, vol. 62, no 6), pps. 1194–1197.
Bhatty, R.S., 1995, "Laboratory and Pilot Plant Extraction and Purification of β–Glucans from Hull–less Barley and Oat Brans" (*Journal of Cereal Science*, 22), pps. 163–170.
Autio, K., Malkki, Y, Virtanen, R., 1992, "Effects of Processing on the Microstructure of Oat (Avena, Sativa) Bran Concentrate and the Physicochemical Properties of Isolated β–Glucans" (*Food Structure*, vol. 11), pps. 47–54.
Doehlert, D.C., Zhang, D., Moore, W.R., 1997, "Influence of Heat Pretreatments of Oat Grain on the Viscosity of Flour Slurries" (*J Sci Food Agric*, 74), pps. 125–131.
Izydorczk, M.S., Biliaderisst, C.G., Macri, L.J., MacGregor, A.W., 1998, "Fractionation of Oat (1→3),(1→4)–β–D–Glucans and Characterisation of the Fractions[1]" (*Journal of Cereal Science*, 27), pps. 321–325.
Saulnier, L., Thhibault, G., & F–J., 1994, "Extraction and Partial Characterisation of β–Glucans from the Endosperms of two Barley Cultivars" (*Journal of Cereal Sciences*, 19), pps. 171–178.

* cited by examiner

*Primary Examiner*—Francisco Prats
(74) *Attorney, Agent, or Firm*—Arlene L. Hornilla; Douglas J. Taylor; Steven Lammert

(57) ABSTRACT

An efficient method for producing high quality beta glucan enriched soluble dietary fiber products is described. An aqueous extraction slurry of beta glucan-containing grain material is homogenized, acidified and enzymatically digested to reduce viscosity and optimize separation of insolubles from the aqueous extract solution. The resulting extract is heat processed to precipitate denatured protein components and subsequently dried or otherwise processed to provide the products for use as food additives or dietary supplements.

30 Claims, 6 Drawing Sheets

BETA-GLUCAN COMPOSITIONS AND PROCESS THEREFORE

FIELD OF THE INVENTION

The present invention relates to a method of isolating soluble fiber from cereal grains. In particular, the invention is directed to an efficient method for producing high quality beta glucan isolates for use as food additives, dietary supplements, seasonings, ingredients, food intermediates and food products which are ready to eat or may undergo a further processing step.

BACKGROUND AND SUMMARY OF THE INVENTION

High fiber products are generally considered to be healthful foods and food ingredients. Foods high in water insoluble fiber are known to improve regularity and bulk formation. Water-soluble fiber content in natural and processed foods has been linked to such beneficial effects as cholesterol reduction, blood sugar regulation in diabetics and prevention of colon cancer. Yet it is widely recognized that soluble fiber is lacking in the diet of most populations, which may be due in part to the taste, availability and difficulty in obtaining high fiber sources. Accordingly there have been significant research and development efforts in the food industry to create high fiber, multifunctional food additives, supplements, ingredients for use in the manufacture of processed foods and food intermediates for health conscious consumers.

Cholesterol in humans comes from primarily two sources, the bodies own production of cholesterol (endogenic) and dietary cholesterol. Typically, the average person consumes between 350–400 milligrams of cholesterol daily, while the recommended intake is around 300 milligrams. Increased dietary cholesterol consumption, especially in conjunction with a diet high in saturated fat intake, can result in elevated serum cholesterol. Elevated serum cholesterol is a well-established risk factor for heart disease and therefore there is a need to mitigate the undesired effects of cholesterol accumulation. High cholesterol levels are generally considered to be those total cholesterol levels at 200 milligrams and above or LDL cholesterol levels at 130 milligrams and above.

Lipoproteins contain specific proteins and varying amounts of cholesterol, triglycerides and phospholipids. There are three major classes of lipoproteins and they include very low-density lipoproteins ("VLDL"), low-density lipoproteins ("LDL") and high-density lipoproteins ("HDL"). The LDLs are believed to carry about 60–70% of the serum cholesterol present in an average adult. The HDLs carry around 20–30% of serum cholesterol with the VLDL having around 1–10% of the cholesterol in the serum. To calculate the level of non-HDL cholesterol present (find the level of LDL or VLDL levels), which indicates risk, the HDL is subtracted from the total cholesterol value. By lowering the total system LDL cholesterol level, it is believed that certain health risks, such as coronary disease and possibly some cancers, that are typically associated with high cholesterol levels, can be reduced.

Soluble fiber typically remains undigested, except by colonic microflora present in the lower intestines. Soluble dietary fiber is believed to have a beneficial effect in the reduction of high serum cholesterol levels and reducing the risk associated with such elevated levels. In addition, soluble dietary fiber can have the additional beneficial effect of reduced constipation and improved stool regularity. However, too much fiber in the diet can create undesirable gastrointestinal side effects such as flatulence, diarrhea, and abdominal cramps, etc. leading consumers to stay away from food products that contain too much dietary fiber, regardless of any associated health benefits. While some consumers may not completely avoid such products, they also do not typically regularly use such products due to the problems enumerated above or alternatively, or in combination due to the unpleasant taste of such products. This illustrates some of the problems with prior solutions that were aimed at providing high fiber diets directed at lowering cholesterol levels, and highlights the need to create a more balanced solution that fits not only within more normal dietary patterns but also meets consumer demand for better tasting, healthy products.

A principal component of cereal grain-derived soluble fiber is beta-glucan. Beta glucan is a naturally occurring polysaccharide component of cell walls of cereal grains. Beta glucan from cereal grains comprises a family of linear polysaccharides comprising D-glucopyranosyl units and having molecular weights ranging from $5 \times 10^5$ to $3 \times 10^6$ Daltons ("Da"). The highest concentrations of beta glucan are found in barley and oats, but beta glucan can also be isolated from wheat and corn. It is, as well, a component of yeasts and fungi. As a natural cereal fiber, beta glucan has been incorporated in a variety of processed food by its existence in the cereal grains, however, the level of beta glucan has been relatively minimal.

The demand for high fiber foods by heath conscious consumers has focused the efforts of food scientists to meet the need for sources of high quality beta glucan products. That need is met by the present invention, which provides an efficient method for extracting beta glucans from cereal sources. More particularly, the present invention provides an efficient method of extracting beta glucans from cereal brans to provide food additive compositions having high beta glucan content.

In one embodiment of the present invention, soluble fiber comprising beta glucan is extracted from cereal bran in a process comprising high pressure homogenization of slurries of grain material, preferably cereal bran, in about 4 to about 8 parts per weight water and acid/enzyme-mediated viscosity reduction of the resulting aqueous extract. Viscosity reduction enables high efficiency separation of the beta glucan containing solution from water insoluble bran components. The aqueous extracts can be dehydrated/dried to a concentrate or powder form for subsequent use as a food additive, ingredient, supplement or food intermediate or for formulating dietary supplements in the form of capsules, tablets or water dispersible powders. In one aspect of the invention, at least a portion of co-extracted protein components are denatured/precipitated and separated before dehydration of the aqueous extracts. In one particular embodiment the resulting aqueous extracts are subjected to further bioprocessing comprising enzymatic digestion and yeast culture beneficiation to reduce levels of non-beta glucan components prior to isolation of the beta glucan product. The isolated products typically contain greater than 50% d.s. beta glucan, optimally greater than 70% d.s. beta glucan and less than 10% protein/starches. The process can be carried out in batch or continuous mode.

A still further embodiment of the present invention describes a process for isolating soluble fiber, specifically beta glucan from grain. The process comprises initially forming an aqueous slurry of a comminuted grain material. The slurry comprises water insoluble components of the grain material, which are suspended in an aqueous solution. The aqueous solution comprises water-soluble fiber and protein components of the grain material. Next, the aqueous slurry is acidified. Then an enzyme preparation is added. The enzyme preparation is selected from the group consisting of cellulase, hemicellulase, xylanase and pentosanase in an amount effective to hydrolyze at least a portion of the soluble components and thereby reduce the viscosity of the solution. Next, the water is separated from the insoluble components and from the aqueous solution. The solution is then heated to denature at least a portion of the soluble protein components in order to form a precipitate and a beta glucan product solution that contains beta glucan and non-beta glucan components. Then removing at least a portion of the water from the resulting product solution.

A still further embodiment of the present invention comprises a process for isolating soluble fiber, namely beta glucan from grain, the process comprising the steps of initially forming an aqueous slurry of a comminuted grain material. The slurry contains water insoluble components of the grain material suspended in an aqueous solution. The aqueous solution contains water-soluble fiber and protein components of the grain material. The aqueous slurry is acidified and then an enzyme capable of hydrolyzing at least a portion of the soluble polysaccharide components and reducing the viscosity of the slurry is added. The pH of the slurry is adjusted to about 4.2 and water insoluble components are separated from the aqueous solution. The aqueous solution is heated to denature at least a portion of the soluble protein components. Then the denatured protein components are separated from the aqueous solution to form a beta glucan product solution containing beta glucan and non-beta glucan components. At least a portion of the water from the product solution is then removed.

A yet still further embodiment of the present invention includes a process for isolating soluble fiber comprising beta glucan from grain. The process comprises the steps of, first forming an aqueous slurry of a comminuted grain material. The slurry comprises water insoluble components of the grain material suspended in an aqueous solution that comprises water-soluble fiber and protein components of the grain material. The aqueous slurry is then acidified to a pH of about 3.8 to about 5.5. Then an enzyme preparation is added in an amount effective to hydrolyze at least a portion of the soluble components and thereby reduce solution viscosity. The water insoluble components are then separated from the aqueous solution. Next, the aqueous solution is heated to denature at least a portion of the soluble protein components. Then the denatured protein components are separated from the aqueous solution to form a beta glucan product solution containing beta glucan and non-beta glucan components and finally, removing at least a portion of the water from the product solution.

Additional embodiments of the present invention relate to a product which is created in a powder form and achieved by one of the foregoing process embodiments. Such a product may also be a food ingredient, food supplement or food additive. In addition, a food product or food intermediate is created which has as a component beta glucan obtained in accordance with one of the preferred process embodiments of the present invention.

BRIEF DESCRIPTION OF THE DRAWINGS

These, as well as other objects and advantages of this invention, will be more completely understood and appreciated by referring to the following more detailed description of the presently preferred exemplary embodiments of the invention in conjunction with the accompanying drawings, of which.

DETAILED DESCRIPTIONS OF THE INVENTION

Figure 1:
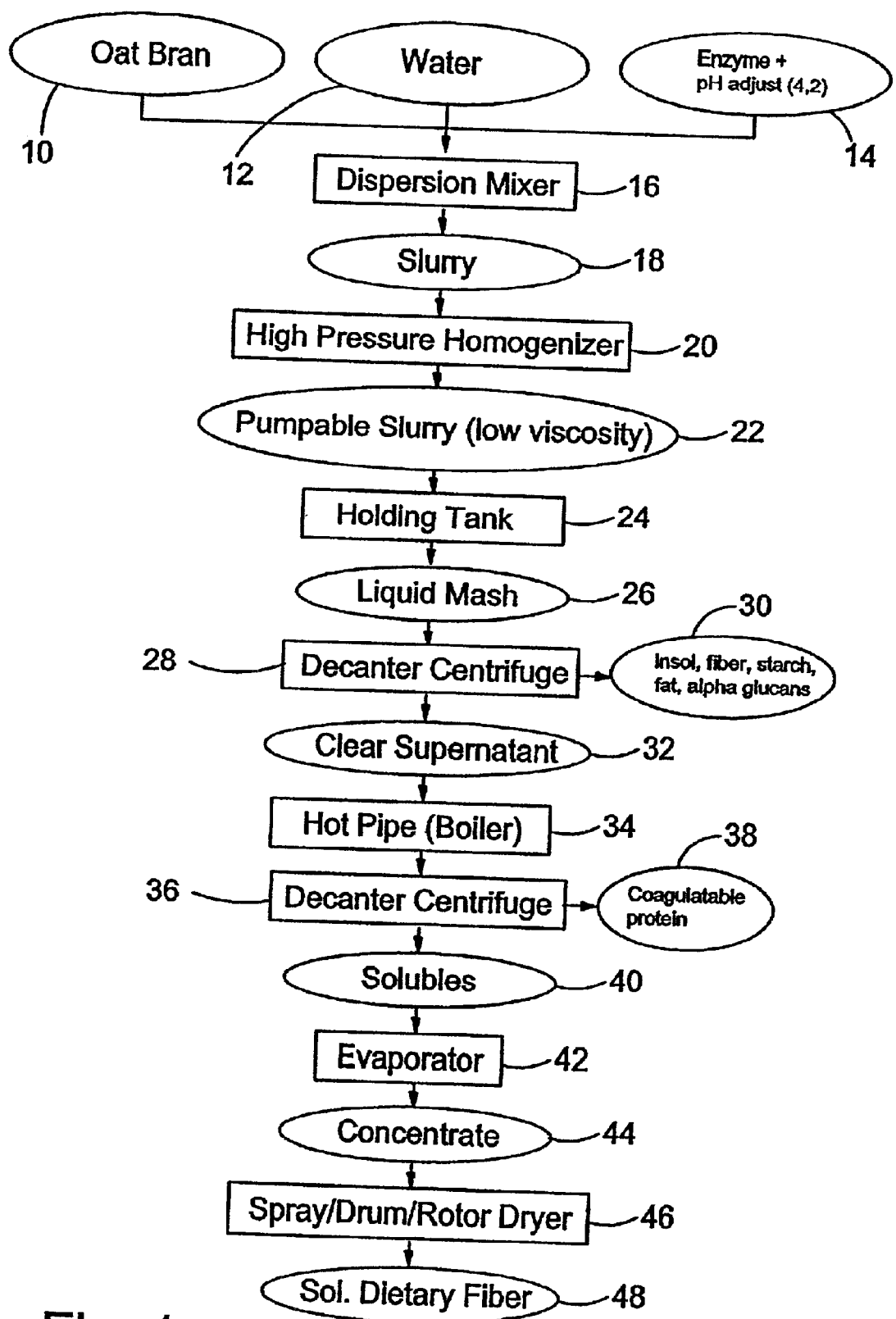
FIGS. 1–3 are flow charts depicting alternate embodiments of the present method for producing beta glucan composition according to the present invention.

The present invention provides a process for producing water-soluble fiber products comprising beta glucan from grain. The beta glucan compositions produced by the present process can be used as dietary supplements, additives or ingredients for processed foods, such as breakfast cereals, yogurt, flour, baking mixes, and snack foods or food intermediates such as dough.

In one embodiment of this invention the process comprises the steps of forming an aqueous slurry of a comminuted grain material, wherein the slurry comprises water insoluble components of the grain material suspended in an aqueous solution comprising water soluble fiber and protein components of the grain material; acidifying the aqueous slurry, typically to a pH of about 3.8 to about 5.5; adding to the slurry an enzyme preparation comprising an exogenous enzyme capable of hydrolyzing at least a portion of the soluble components to reduce the viscosity of the slurry; separating the water insoluble components from the aqueous solution; optionally, but preferably, heating the aqueous solution to denature and precipitate at least a portion of the soluble protein components (including both extracted grain protein and the enzymes used for viscosity reduction) and separating denatured protein components from the aqueous solution; and drying or concentrating the soluble components comprising beta glucan by removing at least a portion of the water from the resulting aqueous solution. Optionally the beta glucan product can be precipitated from the extract solution. Suitable exogenous enzymes for the viscosity reduction step include, for example, commercially available cellulases, hemicellulases, xylanases and pentosanases. They are used in an amount and for a period of time to effect a reduction in slurry viscosity sufficient to allow efficient/effective separation of slurry insolubles, for example, in a decanter centrifuge.

The purity of the beta glucan product can be improved by contacting the aqueous extract with an enzyme capable of digesting one or more of the non beta glucan components for a period of time sufficient to digest at least a portion of said components and thereafter, or concurrently, subjecting the digest to yeast culture beneficiation. Suitable enzymes include amylases including alpha-amylase, glucoamylase, hemicellulases such as xylanase, galactosidase, mannanase, and pentosidase, and proteases such as endoprotease, endo-exo-peptidase, and the like. Enzymes can be used alone or in combination with one another. Following the enzyme digestion step, the enzymes added to the extract are denatured/precipitated and optionally separated from the extract using any one or more of the standard solid separation techniques. The subsequent yeast beneficiation step is carried out by inoculating the enzyme digest of the extract solution with a yeast culture and maintaining the resulting yeast suspension under conditions conductive to yeast assimilation of the assimilable components of the enzyme digest for a period of time sufficient to reduce the concentration of the products of digestion of the non beta glucan components of the extract solution. The resulting bioprocessed extract solution is separated from the yeast and denatured enzymes by filtration, decantation, centrifugation or other separation techniques. The beta glucan product is isolated from the resulting bioprocessed extract solution by either precipitation, for example, by addition of a lower alcohol, or by dehydration processing to separate at least a portion of the water from the beta glucan product.

The step of forming the initial aqueous slurry is accomplished using a weight/mass ratio of grain component: water of about 1 to 4 to about 1 to 8, preferably about 1 to 5 to about 1 to 6. In a typical embodiment, the slurry is formed by blending the grain component with water in a mass ratio of approximately 1:6, respectively. Preferably the blending/extraction step is effected by forming the slurry, preferably holding it as part of a steeping step for a period of time, typically about ¼ hr to about 1 hour, to hydrate the grain component, and thereafter homogenizing it in one or more stages in a high pressure homogenizer or in serial array of high pressure homogenizers.

The high viscosity of the slurry/aqueous solution arising from dissolved polymer solids extracted from the grain material during the extraction step interferes with separation of insolubles from the aqueous solution of extracted solubles. The addition of one or more enzymes, typically as a commercially available enzyme preparation capable of hydrolyzing at least a portion of such dissolved polymer solids, works to decrease the viscosity and increase separation process efficiency. Enzymes useful for the present process include, but are not limited to, enzymes characterized as cellulases, hemicellulases, pentosanases and xylanases. Suitable commercially available enzyme preparations include those available from Rohm Enzyme GmbH under the tradenames Rohalase® and Rohament®, including, for example, Rohalase SEP®, Rohalase EP®, Rohalase 7118® and Rohament CL®.

The amount of such enzymes to be added is dependent on the nature of the enzymes, their unit activity and the desired rate and amount of viscosity reduction. Generally the amounts of enzyme will also depend on the nature of the grain material used as the source of soluble fiber in the process. The preferred amounts can be readily determined empirically by routine experimentation. Typically the amount of enzyme preparation added for the viscosity reduction step is calculated to be an amount, which will reduce slurry viscosity over a digestion period of about 5 to about 90 minutes, to a level sufficient to allow efficient solids separation. Preferably, slurry viscosities are reduced to less than 500 mPas (measured at a shear rate $54.35^{-1}$) to optimize separation of the slurry into its insolubles and aqueous extract (solubles) components. The enzyme(s) can be added to the original extraction slurry, during the steeping step, before or after homogenization, or during the slurring/extraction step.

The steps of separating the insoluble components from the aqueous solution can be carried out by any of a variety of art-recognized separation techniques. Common methods useful for such separation are filtration, settling/decantation and centrifugation. Centrifugation is a preferred method for effective separations in high volume applications of the present invention.

The aqueous extract is typically heat processed to denature and precipitate at least a portion of the component soluble proteins, including added enzymes and proteins extracted from the grain material. Protein denaturation/precipitation can be accomplished by heating the extract solution to a temperature of greater than 90° C., preferably greater than 100° C., and typically in a range of about 90° C. to about 110° C. for about 1 to about 10 minutes. In one example, protein denaturation is carried out in a heat pipe or by microwave treatment at a temperature of about 100° C. for about 3 to about 7 minutes. The precipitated protein is separated from the beta glucan-containing aqueous extract by any acceptable separation process, for example, filtration, decantation or centrifugation.

The dehydrating/drying step of the present process can be performed using any one or more of a variety of art-recognized drying methods. For example, conventional drying methods using a drum or spray dryer are useful to dehydrate the aqueous solution to obtain a dried water-soluble fiber product in powder form. Freeze drying/lyophilization can also be used. In a preferred embodiment of the present process the aqueous solution comprising soluble fiber is subjected to rapid drying techniques using an evaporator and a high-speed rotor device. During the drying step, water is rapidly removed from the concentrated aqueous solution to produce a powder product. An example of such high-speed rotor devices is the TurboRotor™, available from Görgens Mahltechnik, Germany.

"Grain material" as used herein refers to whole grain or any component(s) thereof. Beta glucans, particularly grain beta glucans (oats and barley), are a known source of dietary fiber and have been included in food products that are used in weight control (beta glucans used as fat substitutes) and as cholesterol lowering additives. The beta glucans that are used in this invention can be naturally occurring or be chemically or enzymatically modified by altering the specific linkages. In addition physical modification of the beta glucans may be achieved by shearing. Beta glucans are obtained from milled cereal grains such as oats and barley (waxy, hulless barley being a particularly good source) in a manner discussed below and are then extracted from the milled grains into warm water and then the solids are removed from the solution.

Oat bran used in the present invention is produced by grinding clean oat groats or rolled oats and separating the resulting flour by suitable means, such as sieving, into fractions such that the oat bran fraction is not more then 50% of the original starting material. The separated fraction should have at least 5.5% of beta glucan (dry weight basis), and a total dietary fiber content of at least 16% (dry weight basis), so that at least one third of the total dietary fiber is soluble fiber.

Barley, as used in the present invention, is processed in a manner that resembles oats as set forth above, in that it consists of cleaning, hulling, sieving and then grinding. Waxy hulless barley has a higher dietary fiber content than most other sources of fiber and can range from 14 to 20% of the dry weight and have a beta glucan content of around 8 to 10%.

Figure 2:
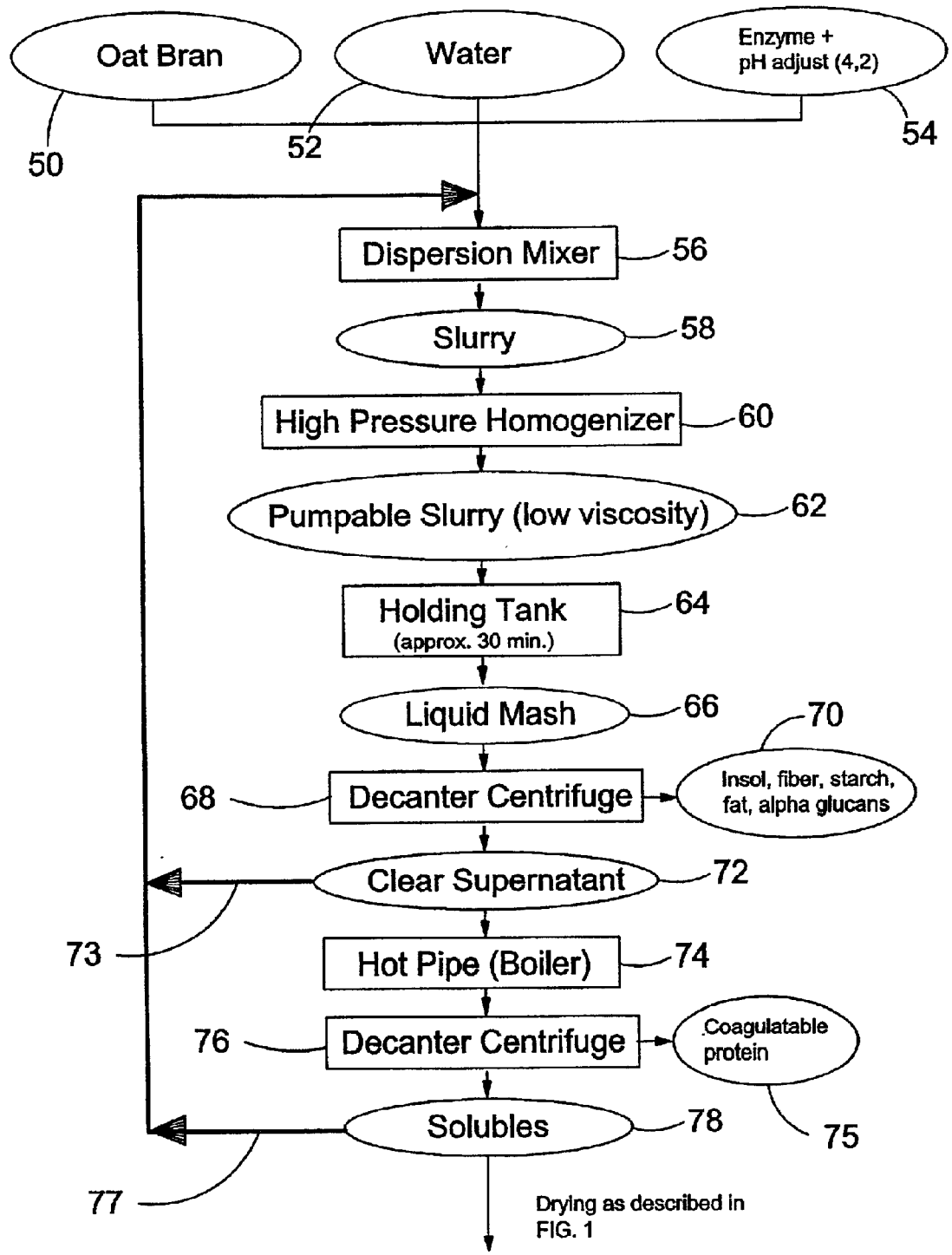

FIGS. 1 and 2 are flow charts demonstrating two illustrative embodiments of the present method. In FIG. 1, a process to obtain beta glucan is provided and includes one part oat bran 10 is mixed with six parts water 12, and an appropriate amount of enzyme 14 is added. The pH is adjusted to 4.2, and the mixture is formed into a slurry 18 in a dispersion mixer 16. During this first portion of the process, hydrolysis of alpha glucans, pentosans and various proteins occurs. After formation, the slurry 18 is passed into a high-pressure homogenizer 20 for homogenization, thus causing disintegration of the oat endosperm and bran parts. During this step, the viscosity of the slurry decreases, forming a pumpable slurry 22, which is passed into a holding tank 24. The pumpable slurry 22 is held in the holding tank 24 for approximately 30 minutes, during which time enzyme hydrolysis proceeds, decreasing the viscosity of the slurry 18 yet further and causing the slurry to become a liquid mash 26.

The mash 26 is transferred from the holding tank 24 to a decanter centrifuge 28 where the mash 26 is subjected to separation at greater than 3000 g in order to separate the starch, fat, protein and insoluble fiber components 30 from the liquid mash, thus receiving a clear supernatant 32 containing the soluble components. This clear supernatant 32 is passed through a heated pipe 34, typically a heated boiler pipe (100° C.), thus causing coagulation of proteins and inactivation of any enzymes present. From the boiler pipe 34, the supernatant 32 is passed into another decanter centrifuge 36 for separation of the coagulated proteins 38.

After the decanter centrifuge 36, the soluble fraction 40 (clear supernatant) is concentrated on an evaporator 42. This concentrate 44 is dried using an industrial dryer 46, such as spray, drum or rotor driers, thus providing the final product 48 containing soluble dietary fiber in powder form.

FIG. 2 shows an alternate embodiment of the present process wherein the amount of water used is decreased and the beta glucan yield increased through the use of recirculation. In FIG. 2, one part oat bran 50 is mixed with less than six parts water 52, and an appropriate amount of enzyme 54 is added. The pH is adjusted to 4.2, and the mixture is formed into a slurry 58 in a dispersion mixer 56.

After formation, the slurry 58 is homogenized under high pressure in homogenizer 60, thus causing disintegration of the oat endosperm and bran parts. During this step, the viscosity of the slurry 62 decreases, forming a pumpable slurry, which is passed into a holding tank 64. The pumpable slurry is held in the holding tank 64 for approximately 30 minutes, during which time enzyme hydrolysis proceeds, decreasing the viscosity of the slurry 62 yet further and causing the slurry 62 to become a liquid mash 66.

The mash 66 is transferred from the holding tank 64 to a decanter centrifuge 68 where the mash 66 is subjected to separation at greater than 3000 g in order to separate the starch, fat, protein and insoluble fiber components 70 from the liquid mash, thus receiving a clear supernatant 72 containing the soluble components. This clear supernatant 72 is either passed through a heated boiler pipe 74 thus causing coagulation of proteins 75 and inactivation of enzymes, or is "recycled" back to the dispersion mixer 56 by a counter-flow process 73, where the supernatant 72 is used in forming the slurry 58.

If the supernatant 72 is not recycled, but rather is passed through the boiler pipe 74, the supernatant 72 is then subjected to further centrifugation in the decanter centrifuge 76. After the decanter centrifuge 76, the soluble fraction 78 (solubles) is either subjected to the counter-flow process 77, which reuses the aqueous soluble fraction 78 and reintroduces it into the dispersion mixer 56 of the first process step (50, 52, 54), or the soluble fraction 78 is dried as described above in FIG. 1 (reference to numerals 42–46).

In this embodiment, a smaller amount of water is used during the process and the efficiency of the separation of the soluble fiber portions from other components is increased by as much as fifty percent (50%). This embodiment allows for isolation of soluble fiber in increased yield, yet reduces the water usage of the system. The aqueous fractions (e.g., the supernatant and/or soluble fractions) can be recycled through the system as many times as necessary to optimize efficiency and yield.

Figure 3:
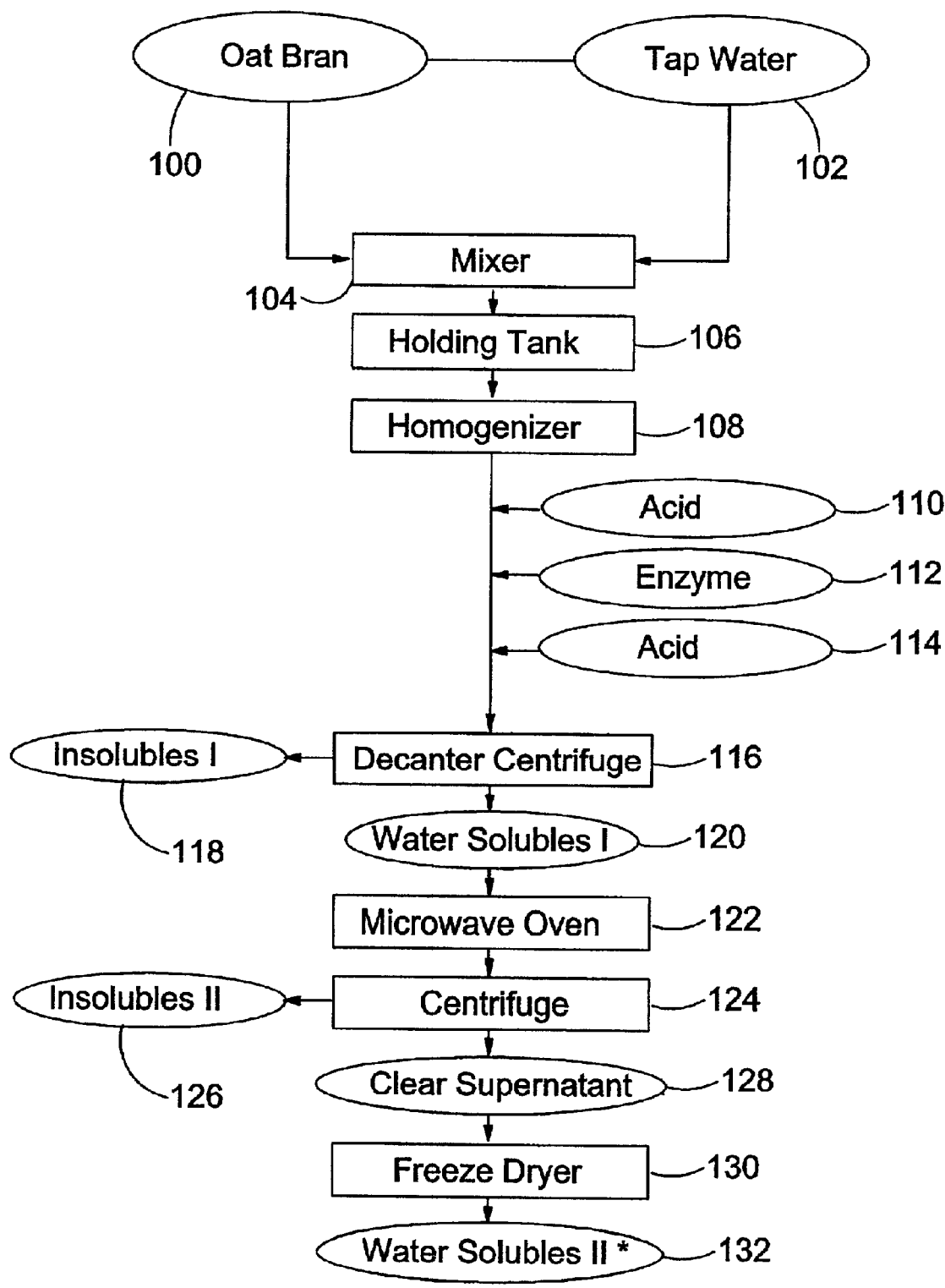

Turning now to FIG. 3, which illustrates a still further embodiment of the present invention oat bran 100 and water 102 are added to mixer 104 in an approximate ratio of one part oat bran 100 to five parts water 102. The temperature of the water 102 is approximately 20° C. The mixer 104 is an Ultra Turrax and the oat bran 100 and water 102 are mixed for approximately 5 minutes at 9000 rpm. The solution is passed into a holding tank 106 where it is allowed to steep for approximately thirty minutes. From the holding tank 106, the mixture is passed to a homogenizer 108 where it undergoes homogenization in a two-step process at a pressure of 200 bars.

Acid 110, preferably hydrochloric acid (HCL) is added to the solution to adjust the pH to 5.0 and after addition of an enzyme 112 and an incubation period of about 20 minutes, a second acid 114 is added to further adjust the pH to 4.2. The resulting liquid mash then enters a decanter centrifuge 116 where the insolubles 118 are separated from it. The remaining soluble fraction 120 (clear supernatant) is then passed to a microwave oven 122 where the solution is heated to approximately 100° C. for about seven minutes. The solution is then subjected to a centrifuge for about 20 minutes at 10,000 rpms and additional insolubles 126 are removed. The resulting soluble fraction (solubles) 128 is then passed to a freeze dryer 130 and the final product 132 containing soluble dietary fiber is obtained.

Alternative embodiments of the invention for producing useful soluble fiber products include processes related to that described above but with one or more steps omitted. Thus, in one embodiment the enzyme addition step can be omitted where the grain aqueous material being extracted does not yield high viscosity extracts. In another embodiment, the protein denaturation/separation steps are omitted to provide a high protein soluble fiber product i.e., one comprising, e.g., about 40 percent to about 60 percent by weight protein and about 40 percent to about 60 percent by weight beta glucan.

Figure 4:
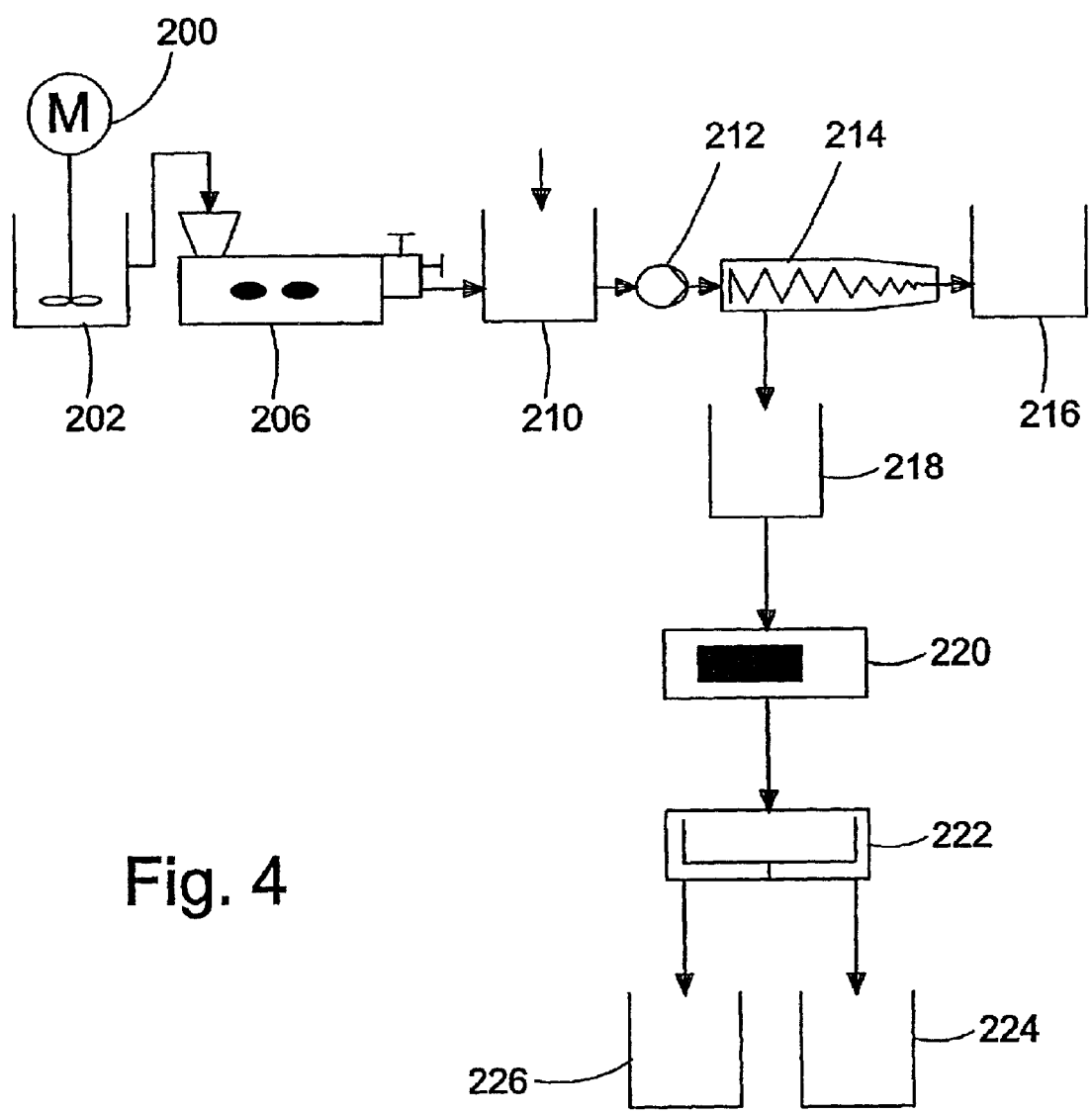
FIG. 4 illustrates a schematic of a processing line for carrying out the present method for producing beta glucan composition in a continuous process according to the present invention.

FIG. 4 represents a schematic of the processing line for carrying out the isolation of the beta glucan. Water and oat bran are introduced into the mixer 200 at a ratio and temperature as previously described. The solution is passed to a holding tank 202 and then into a high-pressure homogenizer 206 were a one or two-step homogenization may occur. After the homogenizer 206, the solution is placed in a holding tank 210 where an enzyme is added and the pH is adjusted over a period of 20 minutes to around a pH of 5. The solution is moved via a pump 212 into a decanter centrifuge 214. The water-soluble portion is collected in a holding tank 218 and the insoluble fractions collected in holding tank 216. The water soluble portion is then heated (microwave oven) 220 and finally passed to a centrifuge 222 where the water soluble portion is collected in holding tank 226 and most of the remaining water insoluble portion is collected in holding tank 224.

Figure 5:
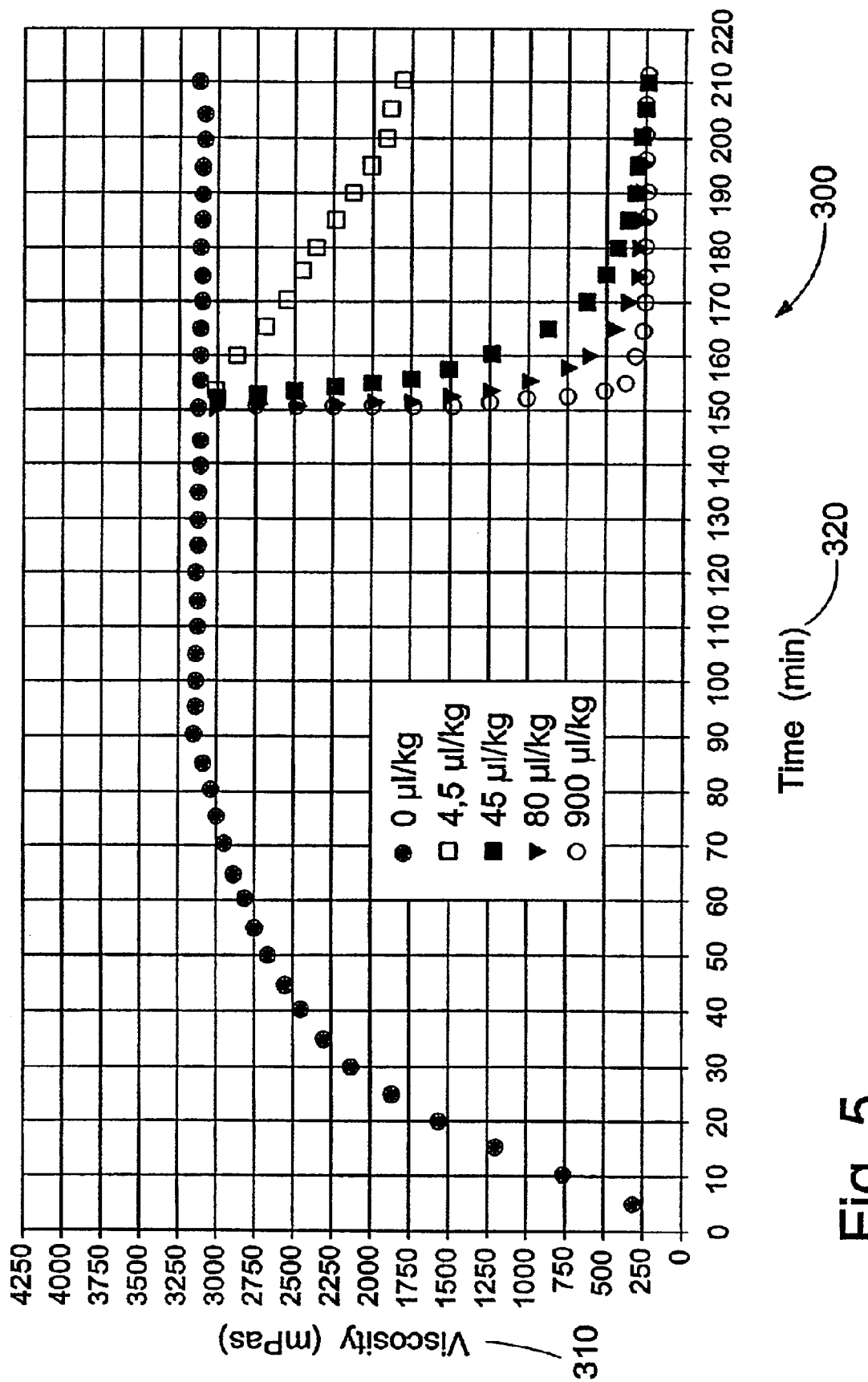
FIG. 5 is a graph depicting viscosity changes of an oat bran dispersion treated with various concentrations of a hemicellulase enzyme preparation according to the present invention.
Figure 6:
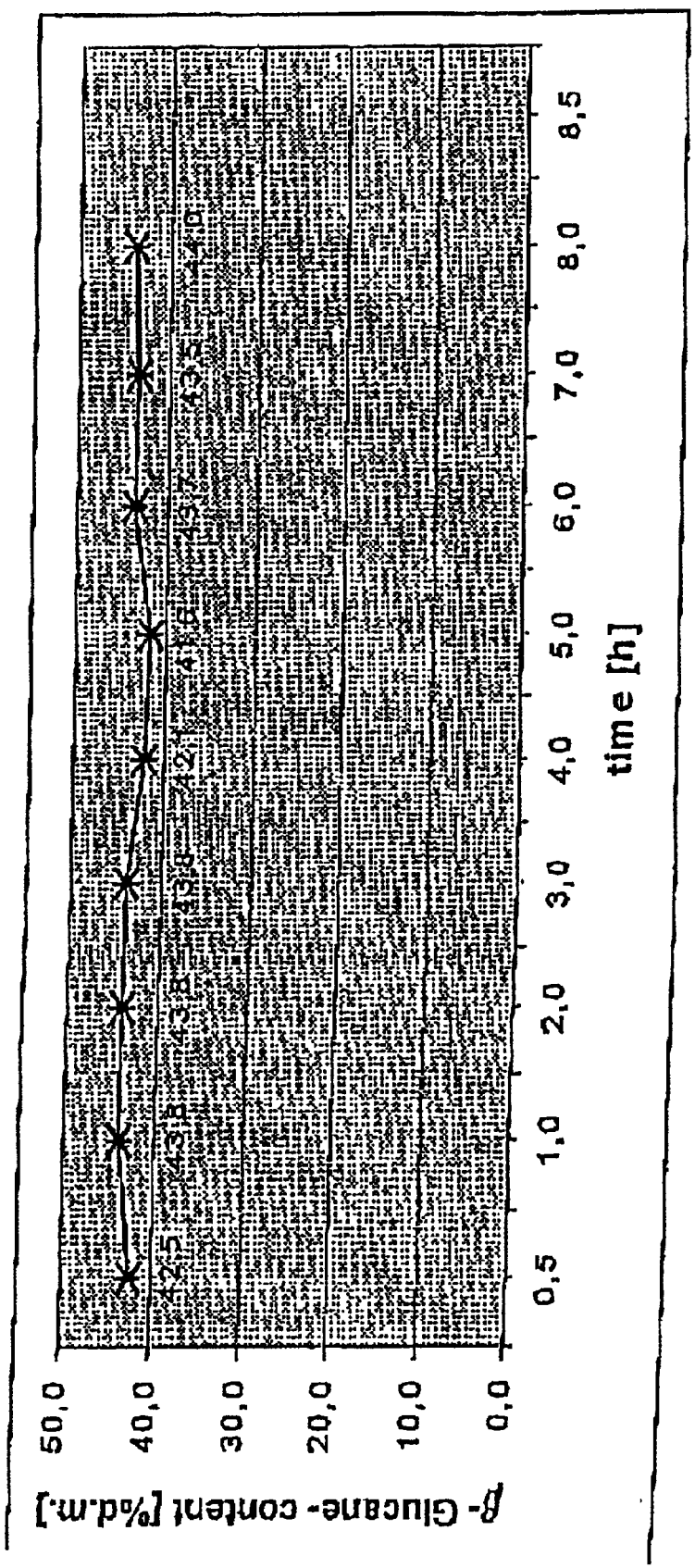
FIG. 6 is a graph illustrating beta glucan content of the soluble dietary fiber product showing the continuous extraction over time from oat bran.

FIG. 5 is a graph 300 depicting viscosity changes 310 of an oat bran dispersion treated with various concentrations of a hemicellulase enzyme preparation over time 320. Two different experiments were carried out. The first experiment was directed at the determination of the viscosity degradation by changing the enzymatic activity and the second experiment (Table 4) shows the influence of viscosity degradation on the separation efficiency resulting from the enzymatic treatment. See also FIG. 6, which illustrates the beta glucan content of the soluble dietary fiber product showing the continuous extraction over time from oat bran.

The present invention embodies a variety of processes for isolation of soluble fiber product containing beta glucan. Examples of such processes within the scope of the present invention are provided to demonstrate the invented process, but are not meant to limit the scope of the invention. For example, oat bran is used in the illustrative examples, but beta glucan can also be extracted from other cereals such as barley.

EXAMPLE 1

Oat bran is mixed with water in a weight ratio of approximately one part oat bran to six parts water, respectively. The mixture is homogenized in a two-stage high (200 bar) pressure homogenizer and the pH of the resulting slurry is adjusted to approximately 4.2 Pentopan® (a pentosanase manufactured by Novo Nordisk) and Rohalase® (a xylanase manufactured by Rohm Enzyme) are added to the slurry to reduce its viscosity. The enzymatically treated slurry is centrifuged to separate solids from the liquid phase, an aqueous solution of soluble fiber and protein comprising components of the bran. The aqueous solution is subsequently heated to about 100° C. to denature and precipitate at least part of the protein. Centrifugal separation provides a substantially clear, aqueous solution containing at least 3% solids comprising about 80% soluble fiber, comprising beta glucan.

The solution is concentrated by evaporation and dried using a TurboRotor™ (Mahltechnik Görgens GmbH), a high-speed rotor drying device to provide the product as a substantially colorless powder.

EXAMPLE 2

Oat bran is mixed with water in a weight ratio of approximately one part oat bran to six parts water, respectively. The mixture is homogenized in a two-stage high (200 bars) pressure homogenizer. The pH of the resulting slurry is adjusted to approximately 4.2, Pentopan® (a pentosanase manufactured by Novo Nordisk) is added to the slurry to reduce viscosity. The slurry is centrifuged to separate bran solids from the liquid phase. The remaining aqueous solution is subsequently heated to about 100° C. to denature and precipitate at least part of the protein. Centrifugal separation provides a substantially clear, aqueous solution containing at least 3% solids comprising about 80% soluble fiber, comprising beta glucan.

The solution is concentrated by an evaporation and dried using a TurboRotor™ (Mahltechnik Görgens GmbH), a high-speed rotor drying device to provide the product as a substantially colorless powder.

EXAMPLE 3

One kilogram of oat bran was mixed with five liters of water, and the resulting mixture was processed in a two-stage high-pressure (200 bars) homogenizer. The pH of the resulting slurry was adjusted to approximately 4.2 and Rohalase® a (xylanase manufactured by Rohm Enzyme) was added to the slurry to reduce its viscosity. The enzymatically treated slurry was centrifuged at 5000 rpm for 10 minutes to separate bran solids from the aqueous solution phase, including water-soluble fiber and protein components of the oat bran. The aqueous solution was subsequently heated to approximately 100° C. to denature and precipitate at least part of the soluble protein. The solution was centrifuged at 5000 rpm for 10 minutes to promote a substantially clear liquid, which was dried yielding 115.9 g of a powder. This powder contained 97.6 g soluble dietary fiber (84.2%) and 4.4 g protein (3.8%).

EXAMPLE 4

Four kilograms of oat bran were mixed with 20 liters of water, and blended in a two-stage high-pressure (170 bar) homogenizer. The pH of the resulting slurry was adjusted to approximately 4.2 and Rohalase® (a xylanase manufactured by Röhm Enzyme) was added to the slurry. Thirty minutes after enzyme addition, the slurry was centrifuged at 5000 rpm for 10 minutes, and the aqueous beta glucan containing solution was decanted from the extracted bran solids. The decanted solution was heated to approximately 100° C., and centrifuged again to remove precipitated protein components to provide a clear aqueous solution, which was thereafter dehydrated to provide a powder. This powder contained 71.1 g soluble dietary fiber (88.7%) and 2.3 g protein (3.2%) per kilogram of starting material.

EXAMPLE 5

The same procedure was followed as described in Example 4, except that the heating step was omitted. After the centrifugal separation, the remaining, almost clear, liquid was dried, yielding a powder, 66.9 g per kilogram of starting material. This powder contained 56.1 g soluble dietary fiber (83.9%) and 2.7 g protein (4.0%) of per kilogram of starting material.

EXAMPLE 6

Execution of the Continuous Step for Making an Oat Bran Extract

The central machine of the process flow diagram (see FIG. 3) which is depicted in the schematic of the processing line (illustrated in FIG. 4) was the decanter. This machine was running continuously for 25 hours, without interrupting the incoming flow. The continuous incoming flow to the decanter was ensured via a preparation of 16 batches of oat bran water suspension. The type of preparation of the oat bran water suspension was done in a similar manner or in the same way as the previously conducted batch experiments (Tests 1–7, see the following tables), each as depicted in the process flow diagram of FIG. 3. Each of the 16 batches consisted of 9 kg, and was composed of approximately 1.5 kg oat bran and 7.5 kg water, so that a total of 24 kg oat bran was processed. From the end and intermediate products, after definite time intervals samples were taken and analyzed on their dry substance content. The solubles fractions, labeled Solubles I 120 and Solubles II 132 (FIG. 3) were freeze dried. The dry matter determination of the fractions in insolubles was done by infrared drying.

RESULTS: The results from those tests which were taken during the continuous oat bran extraction are listed in Table 1. The dry substance content of the samples which were taken over the entire time frame of the tests varied only to a small extent, thus confirming the process stability of the continuous bran extraction process. The comparison of the median dry substance content of batch Tests 1–7 (conducted per process shown in FIG. 3) with the dry substance content of the bran fraction from the continuous process (see Table 3) shows almost no significant substantial differences or variations. Of special value is the confirmation of the median dry matter content found in the fraction Solubles II (FIG. 3) which resulted in a median of 2.8% in case of discontinuous extraction and of 3.0% in case of continuous extraction.

Table 3 contains a comparison between the dry matter balance of the bran fractions of the previous batch extraction (Tests 1–7) and that of the continuous extraction. With 13.2% of the initial dry matter, the yield of the soluble dietary fiber product (Solubles II) in continuous extraction is only 1.9% lower than the yield in the discontinuous extraction. The beta glucan content of the freeze-dried samples of fractions Solubles II of the continuous extraction varied between 42 and 44% during the process time. Thus the yield of beta glucan from the beta glucan content of the bran (7.2%) was 78.8%).

CONCLUSION: The continuous test to obtain a beta glucan rich soluble fraction from oat bran confirmed the tests, which were obtained in a batch process. The continuous process design and process execution could be realized except the drying of the final product. For a complete continuous process design a second decanter should be used for the separation of fraction Solubles II and Insolubles II. For the continuous drying of Solubles II a spray dryer should be used.

TABLE 3-continued

Median dry matter balance of the continuous extraction in comparison with the median dry matter balance of the continuous extraction

| | Median dry matter balance [%] | |
|---|---|---|
| Fraction | Continuous | Discontinuous |
| Solubles II | 13.2 | 15.1 |
| Insolubles II | 16.3 | 16.0 |
| Total II | 29.5 | 31.1 |

EXAMPLE 7

Enzymatic Treatment of Oat Bran Dispersions with "Rohalase 7118®"

1. Aim of the Trials:

The degradation of the viscosity of oat bran dispersions necessary for their centrifugal separation in a soluble and an insoluble fraction was investigated. The trials were carried out according to our previous laboratory scale experiments concerning the beta glucan extraction from oat bran. The experimental conditions were chosen in such a way that they

TABLE 1

Dry matter of the fractions from oat bran during the continuous extraction process.

| | d.m. [%] after process time [h] | | | | | | | | | | |
|---|---|---|---|---|---|---|---|---|---|---|---|
| Fraction | 0.5 | 1 | 2 | 3 | 4 | 5 | 6 | 7 | 8 | 8.5 | x̄ |
| Solubles I | 6.1 | 6.6 | 6.3 | 6.8 | 6.1 | 6.4 | 6.4 | 6.2 | 5.7 | 6.0 | 6.3 |
| Insolubles I | 40.8 | 40.4 | 40.7 | 40.7 | 40.1 | 40.3 | 40.2 | 40.6 | 40.2 | 40.0 | 40.4 |
| Solubles II | 2.9 | 3.1 | 2.8 | 2.8 | 3.0 | 3.0 | 3.0 | 3.0 | 3.0 | 2.9 | 3.0 |
| Insolubles II | 37.4 | 35.9 | 35.2 | 32.7 | 33.3 | 35.6 | 33.9 | 33.9 | 35.3 | 35.7 | 34.9 |

TABLE 2

Dry matter of the fractions from oat bran during discontinuous extraction in comparison with the dry matter of the fractions of continuous extraction

| | d.m. [%] after process time [h] | | | | | | | |
|---|---|---|---|---|---|---|---|---|
| Fraction | 1 | 2 | 3 | 4 | 5 | 7 | x̄* | x̄** |
| Solubles I | 7.5 | 7.5 | 7.0 | 5.8 | 6.0 | 5.7 | 6.6 | 6.3 |
| Insolubles I | 39.1 | 36.1 | 36.5 | 39.4 | 39.9 | 39.8 | 38.5 | 40.4 |
| Solubles II | 2.5 | 3.1 | 2.6 | 3.1 | 2.8 | 2.8 | 2.8 | 3.0 |
| Insolubles II | 33.9 | 28.2 | 35.1 | 31.6 | 33.3 | 31.7 | 32.3 | 34.9 | x̄* = median of the continuous extraction
x̄** = median of the discontinuous extraction

TABLE 3

Median dry matter balance of the continuous extraction in comparison with the median dry matter balance of the continuous extraction

| | Median dry matter balance [%] | |
|---|---|---|
| Fraction | Continuous | Discontinuous |
| Solubles I | 29.5 | 31.1 |
| Insolubles II | 70.5 | 68.9 |
| Total I | 100 | 100 | were on the one hand close to the laboratory scale working parameters and were on the other hand adapted to the viscometer used for the determination of the viscosity. Two different experiments were carried out. The first experiment aimed at the determination of the viscosity degradation by changing the enzymatic activity and the second should show the influence of viscosity degradation on the separation efficiency resulting from the enzymatic treatment. The working parameters used are shown in FIG. 5 and Table 4.

2. Results

The oat bran used in the experiments had almost no endogenous enzymatic activity related to the viscosity degradation. After preparation of the dispersions the viscosity increased tenfold. This increase was caused by the swelling of beta glucans and some other hemicellulases. The dispersion reached such a high viscosity that a centrifugal separation into its solubles and insolubles was totally impossible. The velocity of the viscosity degradation by Rohalase 7118 depended on the enzyme concentration (activity) (FIG. 5). It was possible to reach the final viscosity between 5 and 40 minutes of enzyme action. From this it can be concluded that the separation efficiency can be controlled either by the enzyme concentration or the reaction time. This was proved by the second experiment (Table 4) which showed that the fraction of insolubles increased when the viscosity of the solubles decreased. This indicates that centrifugal separation of highly viscous oat bran dispersions (viscosity greater than 200 mPas) is only possible when hemicellulases, like Rohalase®, break the viscosity to a certain but limited extent. As the degradation of viscosity is related to the molecular degradation of hemicelluloses, e.g., beta glucans, it is possible to control both the beta glucan degradation as well as their extractability from the dispersion by centrifugal separation by measuring the viscosity.

TABLE 4

Influence of the viscosity on the separation of the insolubles of the enzymatically treated oat bran dispersion

| Hydrolysis [min][1] | Viscosity [mPas][2] | Insolubles [%][3] |
|---|---|---|
| 0 | 1270 | not possible |
| 10 | 981 | 17.4 |
| 30 | 712 | 18.1 |
| 60 | 461 | 19.6 |
| 90 | 367 | 20.9 |

[1]Experiment 2: No swelling allowed after homogenization
[2]Shear rate: 54.3 s$^{-1}$
[3]Percent of total dispersion
Oat bran dispersion: 1 part oat bran +5 parts tap water
High pressure homogenization: two steps, each 200 bar
Enzyme: Rohalase 7118 ®; concentration: 45 µl/kg oat bran; pH 5.0; ambient temperature (ca. 20° C.); Rohalase ® was added directly after the homogenization step.

EXAMPLE 8

Fermentation Beneficiation 4.6 g beta Glucan containing product (dry product, 5% moisture) containing 54.7% beta glucan in dry matter was mixed with 500 g distilled water and cooked for 2 hrs. (Note: in an industrial process, a slurry containing approximately 3 to 30% solids containing beta glucan would be used.) 160 Microliters glucoamylase (Brewers Diase/Gist Brocades), 80 microliters endoprotease (Alcalase 2.4 L/FG/Novo) and 80 microliters endo-exopeptidase (Flavorourenzyme 1000 L/Novo Nordisk) were added. The mixture was subsequently kept for 2 hrs at 50° C. and then briefly heated to 100° C. to inactivate and precipitate the enzymes. After cooling to 30° C., 5 g of a thick yeast suspension (Saccharomyces cerreviseae) was added and fermented for 1 hr under aerobic conditions at 30° C. Then distilled water was added to obtain 505 g total suspension. The slurry was centrifuged at 5000 rpm to separate the yeast. The beta glucan content of the dry matter was increased (to 71.1%).

It will thus be seen according to the present invention a highly advantageous process for isolating soluble dietary fiber has been provided. While the invention has been described in connection with what is presently considered to be the most practical and preferred embodiment, it will be apparent to those of ordinary skill in the art that the invention is not to be limited to the disclosed embodiment, that many modifications and equivalent arrangements may be made thereof within the scope of the invention, which scope is to be accorded the broadest interpretation of the appended claims so as to encompass all equivalent structures and products.

We claim:

1. A non-alcohol process for isolating soluble dietary fiber comprising beta glucan from grain, said process comprising the steps of forming by homogenization, an aqueous slurry of a comminuted grain material, said slurry comprising water insoluble components of the grain material suspended in an aqueous solution comprising water soluble dietary fiber and protein components of the grain material;

acidifying the aqueous slurry;

adding an enzyme preparation comprising an enzyme selected from the group consisting of cellulase, hemicellulase, xylanase and pentosanas in an amount effective to hydrolyze at least a portion of the soluble components and thereby reduce solution viscosity;

separating the water insoluble components from the aqueous solution;

heating the aqueous solution to denature at least a portion of the soluble protein components to form a precipitate and a beta glucan product solution containing beta glucan and non beta glucan components; and removing at least a portion of the water from the resulting product solution.

2. The process of claim 1 wherein the step of forming the slurry is accomplished using a ratio of grain material: water of about 1:4 to about 1:8.

3. The process of claim 1 wherein the step of forming the slurry is accomplished using a ratio of grain material: water of about 1:5 to about 1:6.

4. The process of claim 1 wherein the aqueous slurry of grain material is also subjected to high shear in a homogenizer.

5. The process of claim 1 further comprising the step of separating the denatured protein-containing precipitate from the heated aqueous solution.

6. The process of claim 1 wherein the grain material is derived from barley.

7. The process of claim 1 wherein the grain material is derived from oats.

8. The process of claim 1 wherein after the viscosity reduction step the pH of the slurry is adjusted to about 4.2 before separating the water insolubles from the aqueous solution.

9. The process of claim 1 further comprising the step of contacting the beta glucan product solution with an enzyme capable of digesting at least a portion of the non beta glucan components.

10. A non-alcohol process for isolating soluble fiber comprising beta glucan from grain, said process comprising the steps of forming by homogenization, an aqueous slurry of a comminuted grain material, said slurry comprising water insoluble components of the grain material suspended in an aqueous solution comprising water soluble fiber and protein components of the grain material;

acidifying the aqueous slurry to a pH of about 3.8 to about 5.5;

adding an enzyme preparation comprising an enzyme selected from the group consisting of cellulase, hemicellulase, xylanase and pentosanas in an amount effective to hydrolyze at least a portion of the soluble components and thereby reduce solution viscosity;

separating the water insoluble components from the aqueous solution;

heating the aqueous solution to denature at least a portion of the soluble protein components;

separating denatured protein components from the aqueous solution to form a beta glucan product solution containing beta glucan and non beta glucan components; and removing at least a portion of the water from the product solution.

11. The process of claim 10 wherein the step of forming the slurry is accomplished using a ratio of grain material: water of about 1:4 a about 1:8.

12. The process of claim 10 wherein the grain material is derived from barley.

13. The process of claim 10 wherein the grain material is derived from oats.

14. The process of claim 10 further comprising the step of contacting the beta glucan product solution with an enzyme capable of digesting at least a portion of the non beta glucan components.

15. A product in powder form prepared in accordance with claim 1.

16. A product in powder form prepared in accordance the claim 6.

17. A product in powder form prepared in accordance the claim 7.

18. A non-alcohol process for isolating soluble dietary fiber comprising beta glucan from grain, said process comprising the step of
   forming by homogenization, an aqueous slurry of a comminuted grain material, said slurry comprising water insoluble components of the grain material suspended in an aqueous solution comprising water soluble dietary fiber and protein components of the grain material;
   acidifying the aqueous slurry;
   adding to the slurry an enzyme capable of hydrolyzing at least a portion of the soluble polysaccharide components and reducing the viscosity of the slurry, wherein the enzyme is selected from the group consisting of cellulase, hemicellulase, xylanase and pentosanase;
   adjusting the pH of the slurry to about 4.2 and separating the water insoluble components from the aqueous solution;
   heating the aqueous solution to denature at least a portion of the soluble protein components;
   separating denatured protein components from the aqueous solution to form a beta glucan product solution containing beta glucan and non beta glucan components; and
   removing at least a portion of the water from the product solution.

19. The process of claim 18 wherein the grain material is derived from barley.

20. The process of claim 18 wherein the grain material is derived from oat.

21. The process of claim 18 further comprising the step of contacting the beta glucan product solution with an enzyme capable of digesting at least portion of the non beta glucan components.

22. A water soluble dietary fiber product prepared in accordance with the process of claim 18.

23. A food ingredient prepared in accordance with claim 1.

24. A food supplement prepared in accordance with claim 1.

25. A food additive prepared in accordance with claim 1.

26. A food product having as a component soluble fiber extracted in accordance with claim 1.

27. A food intermediate having as a component soluble fiber extracted in accordance with claim 1.

28. A process for isolating soluble dietary fiber comprising beta glucan from grain, said process comprising:
   forming an aqueous slurry of a comminuted grain material, said slurry comprising water insoluble components of the grain material suspended in an aqueous solution comprising water soluble dietary fiber and protein components of the grain material;
   acidifying the aqueous slurry;
   adding an enzyme preparation comprising an enzyme selected from the group consisting of cellulase, hermcellulase, xylanase, and pentosanase in an amount effective to hydrolyze at least a portion of the soluble component and thereby reduce solution viscosity;
   separating the water insoluble components from the aqueous solution;
   heating the aqueous solution to denature at least a portion of the soluble protein components to form a precipitate and a beta glucan product solution containing beta glucan and non beta glucan components;
   removing at least a portion of the water from the resulting product solution;
   contacting the beta glucan product solution with an enzyme capable of digesting at least a portion of the non beta glucan components; and
   inoculating the beta glucan product solution with yeast and maintaining the resulting yeast suspension under conditions conducive to the assimilation of at least a portion of the products of enzyme digestion of the non beta glucan components.

29. A process for isolating soluble fiber comprising beta glucan from grain, said process comprising:
   forming an aqueous slurry of a comminuted grain material, said slurry comprising water insoluble components of the grain material suspended in an aqueous solution comprising water soluble fiber and protein components of the grain material;
   acidifying the aqueous slurry to a pH of about 3.8 to about 5.5;
   adding an enzyme preparation in an amount effective to hydrolyze at least a portion of the soluble components and thereby reduce solution viscosity;
   separating the water insoluble components from the aqueous solution;
   heating the aqueous solution to denature at least a portion of the soluble protein components;
   separating denatured protein components from the aqueous solution to form a beta glucan product solution containing beta glucan and non beta glucan components;
   removing at least a portion of the water from the product solution;
   contacting the beta glucan product solution with an enzyme capable of digesting at least a portion of the non beta glucan components; and
   inoculating the beta glucan product solution with yeast and maintaining the resulting yeast suspension under conditions conducive to the assimilation of at least a portion of the products of enzyme digestion of the non beta glucan components.

30. A process for isolating soluble dietary fiber comprising beta glucan from grain, said process comprising the steps of
   forming an aqueous slurry of a comminuted grain material said slurry comprising water insoluble components of the grain material suspended in an aqueous solution comprising water soluble dietary fiber and protein components of the grain material;
   acidifying the aqueous slurry;
   adding to the slurry an enzyme capable of hydrolyzing at least a portion of the soluble polysaccharide components and reducing the viscosity of the slurry;

adjusting the pH of the slurry to about 4.2 and separating the water insoluble components from the aqueous solution;

heating the aqueous solution to denature at least a portion of the soluble protein components;

separating denatured protein components from the aqueous solution to form a beta glucan product solution containing beta glucan and non beta glucan components;

removing at least a portion of the water from the product solution;

contacting the beta glucan product solution with an enzyme capable of digesting at least a portion of the non beta glucan components; and inoculating the beta glucan product solution with yeast and maintaining the resulting yeast suspension under conditions conducive the assimilation of at least a portion of the products of enzyme digestion of the non beta glucan components.

* * * * *